Inventor
Luigi Danelon
By Robert E. Burns
Attorney

Dec. 11, 1951   L. DANELON   2,578,403
VARIABLE SPEED TRANSMISSION MECHANISM
Filed Nov. 8, 1949   2 SHEETS—SHEET 2
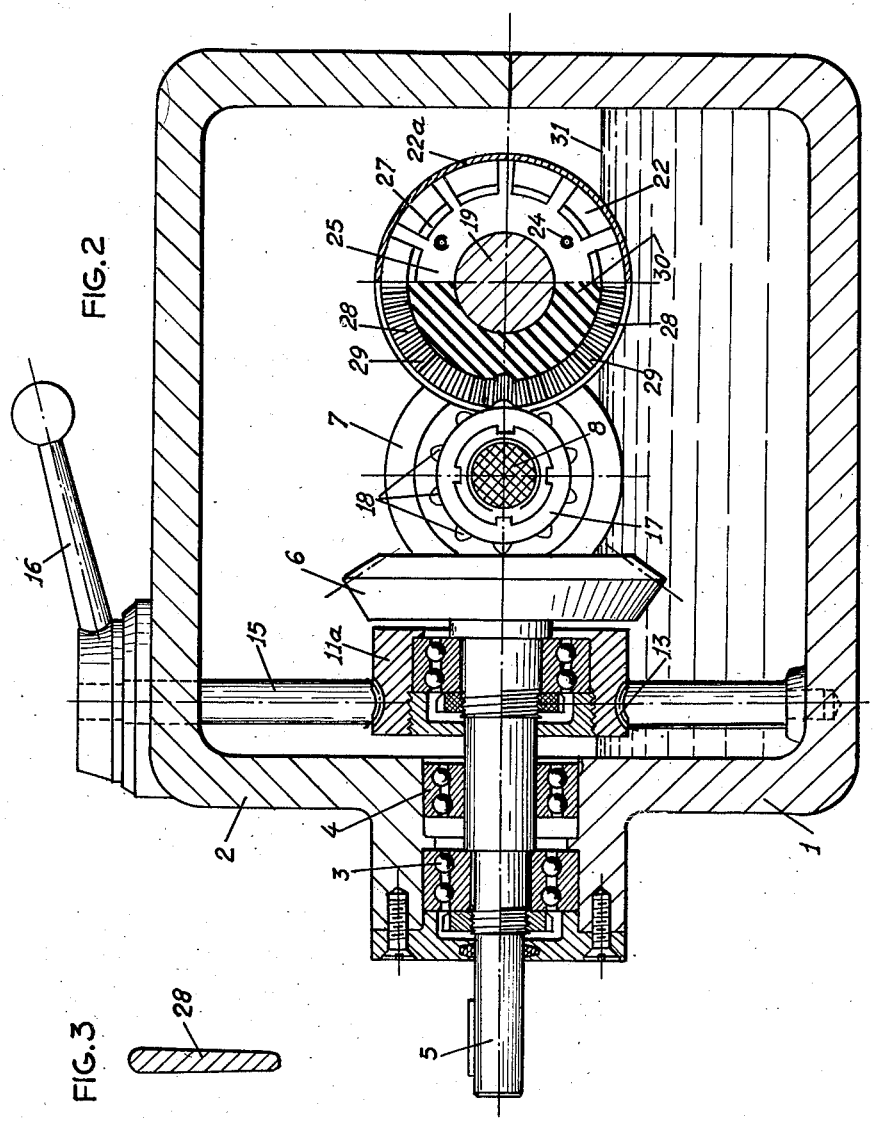
Inventor
Luigi Danelon
By Robert E. Burns
Attorney Patented Dec. 11, 1951

2,578,403

UNITED STATES PATENT OFFICE 2,578,403

VARIABLE-SPEED TRANSMISSION MECHANISM

Luigi Danelon, Aosta, Italy

Application November 8, 1949, Serial No. 126,224
In Italy November 10, 1948

7 Claims. (Cl. 74—325)

This invention relates to a variable speed transmission mechanism for gradually varying speed between a driving and a driven shaft.

A first object of this invention is to provide a gradual variation in speed between zero and a maximum speed.

A further object of this invention is to permit reversing of the direction of the driven shaft, and the gradual variation in speed being identical in both directions of rotation.

A further object of this invention is to provide a variable speed transmission mechanism, in which the loss in efficiency under the various conditions of load and transmission ratio is minimized.

The above and further objects of this invention will be understood from the appended specification in which reference is made to the accompanying drawing which shows by way of example an embodiment of my improved mechanism.

Figure 2 is a section taken along line II—II of Figure 1, and

Figure 3 is a sectional view of a detail of the mechanism.

Figure 1:
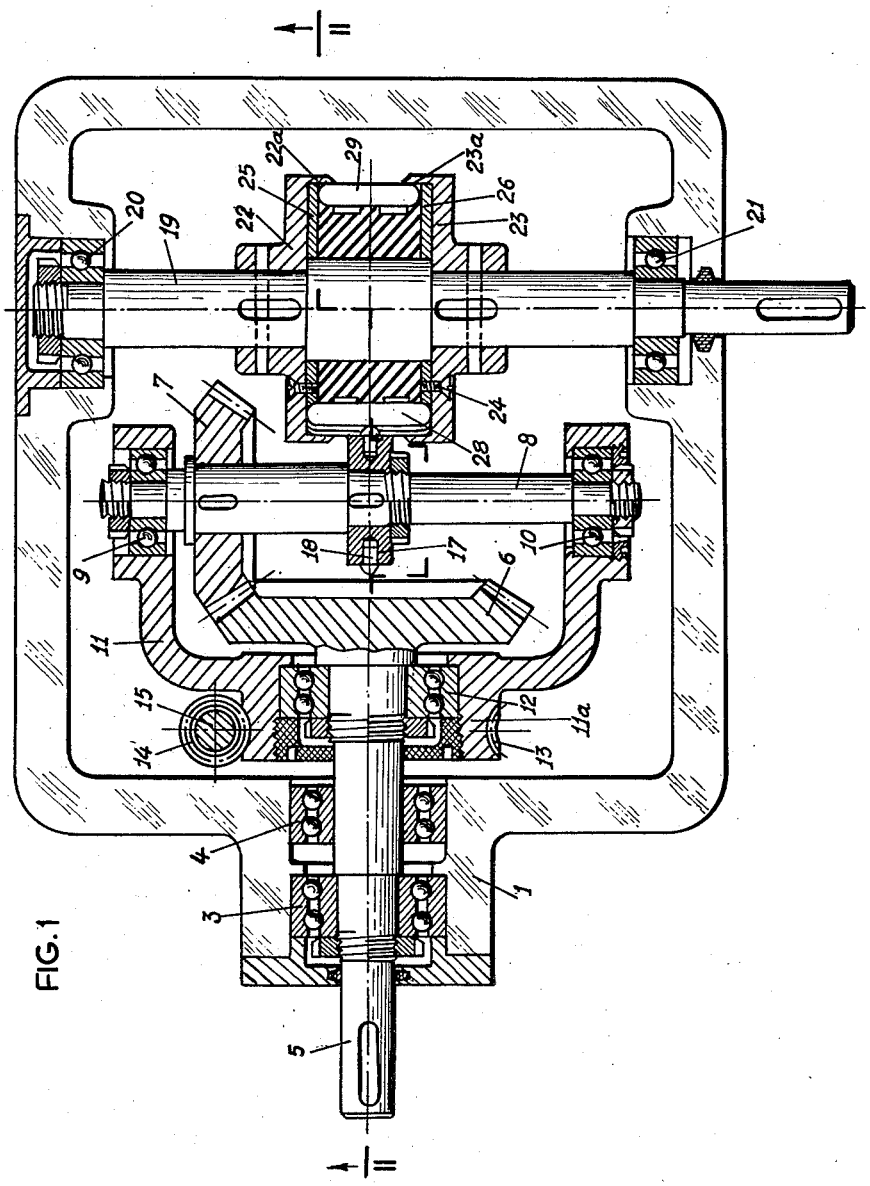
Figure 1 is an axial horizontal section of the variable speed transmission mechanism.

Referring to the drawings, 1 and 2 denote the two halves of the divided casing of the variable speed transmission mechanism. A driving shaft 5 is supported therebetween and rotates on ball bearings 3, 4. The shaft 5 has integral therewith a bevel wheel 6 meshing with a bevel wheel 7 keyed on an intermediate shaft 8 rotatably mounted through bearings 9, 10 on a cup-shaped member 11. The latter is formed with a hub 11a rotatably mounted by means of a bearing 12 on the driving shaft 5. The hub 11a carries a set of helical teeth 13 meshing with a worm screw 14 formed on a shaft 15 rotatably supported between the halves 1 and 2 of the casing. The shaft 15 has secured to its end projecting from the casing an operating lever 16. The inclination of the screw threads is such as to insure non reversibility in drive.

The intermediate shaft 8 has keyed thereon a ring 17 carrying at its periphery pins 18 having an ogival head. The ring 17 and pins 18 form a cog wheel of which the plane of symmetry encloses the central line of the driving shaft 5. 19 denotes the driven shaft rotatable on bearings 20, 21 on the frame. The shaft 19 has keyed thereon two flanged discs 22, 23 having secured to their inner walls by means of screws 24 two discs 25, 26 formed with peripheral slots 27. Laminations 28 are arranged in the slots 27 and their end surfaces are of a semi-circular profile; each lamina is of a cone frustrum-shaped section as shown in Figure 3. The laminations 28 have interposed therebetween laminations 29 smaller in length, guided between the discs 25, 26. The laminae 28, 29 rest at their radially inner ends on a rubber sleeve 30 mounted on the shaft 19 and likewise confined between the discs 25 and 26.

The above described element will be referred to hereafter as "compound wheel."

The rubber sleeve 30 tends to radially displace towards the outside the laminae 28 and 29 which are retained by the bent edges 22a and 23a of the discs 22 and 23, so that they are situated within range of the pins 18.

Lubrication of the various parts of the mechanism, more particularly of the slidable laminae 28 and 29 is taken care of by an oil bath 31.

The device operates as follows.

Rotation of the driving shaft 5 causes through the right angle bevel gearing 6, 7 rotation of the intermediate shaft 8 and cog wheel 17, 18. The pins operate like a hob by entering the laminations on the compound wheel, thereby displacing towards the centre of the wheel a number of laminae corresponding to the profile of the pin meshing therewith. As the pin action ceases, the laminae resume their initial position as the rubber sleeve 30 is released. In order to vary speed, the operating lever 16 is acted upon and rotates by means of the worm gear 14, 13 the support 11 carrying the intermediate shaft 8. Consequently, the shaft 8 of the cog wheel performs an angular displacement with respect to the shaft 19 of the compound wheel, the width of said displacement depending upon the extent of rotation of the operating lever 16.

Assuming $a$ is the angular displacement of the two shafts 8, 19

$p$ the circular pitch of the pins 18, $Z$ the number of pins, $Dp$ the primitive diameter of the compound wheel, the variable speed transmission ratio will equal $$\frac{p.z.\cos\alpha}{Dp.\pi}$$

By varying $a$ between 0° and 180°, any desired speed transmission ratio included between the maximum speed value and zero is obtained in either direction of rotation.

What I claim is:

1. In a variable speed transmission mechanism, in combination, a first shaft, a second shaft, one of said shafts being a driving shaft and the other of said shafts being a driven shaft, a third shaft arranged to be driven by said first shaft, said second shaft and said third shaft being disposed in parallel planes, a cog wheel mounted on said third shaft, said cog wheel having peripherally-spaced radial pins, a compound wheel disposed in meshing engagement with the pins of said cog wheel, said compound wheel comprising two spaced flanges mounted upon said second shaft and a plurality of laminae disposed in an annular row between said flanges, said laminae being engageable by the said pins of the cog wheel, resilient means urging said laminae radially outwardly but permitting radially inward displacement by said pins, means for rotating said third shaft about a transverse axis whereby to displace the radial plane of said cog wheel relative to said compound wheel for varying the speed transmission ratio between said first and said second shafts.

2. Variable speed transmission mechanism as claimed in claim 1, in which said annular row of laminae comprises laminations mounted for radial displacement in peripheral grooves in two discs fixed to the internal faces of said flanges and laminations smaller in length interposed between the firstmentioned laminations and laterally guided by said discs.

3. Variable speed transmission mechanism as claimed in claim 1, wherein said resilient means consists of a sleeve of rubber-like material mounted on the shaft of the compound wheel and resiliently deformable under the thrust of the individual laminae produced by the pins entering the laminations.

4. Variable speed transmission mechanism as claimed in claim 1, wherein the laminae are of cone frustrum-shaped section and their ends are of semi-circular profile.

5. A variable speed transmission mechanism as defined in claim 1 wherein the axes of said first shaft and said third shaft are perpendicular and said rotating means are adapted to rotate said third shaft about the axis of the first shaft.

6. In a variable speed transmission mechanism, in combination, a driving shaft, a driven shaft, a bearing member rotatably mounted on said driving shaft, a third shaft rotatably mounted in said bearing member at right angles to said driving shaft, said driving shaft and said third shaft being disposed in parallel planes, a cog wheel mounted on said third shaft, beveled gearing means connecting said driving shaft with said third shaft, said cog wheel having peripherally-spaced radial pins, a compound wheel disposed in meshing engagement with the pins of said cog wheel, said compound wheel comprising two spaced flanges mounted upon said driven shaft and a plurality of laminae disposed in an annular row between said flanges, said laminae being engageable by the said pins of the cog wheel, resilient means urging said laminae radially outwardly by permitting radially inward displacement by said pins, means for rotating said third shaft about a transverse axis whereby to displace the radial plane of said cog-wheel relative to said compound wheel for varying the speed transmission ratio between said driving shaft and said driven shaft.

7. Variable speed transmission mechanism as defined in claim 6 wherein said bearing member carries a set of helical teeth and said means for rotating said bearing member comprise a worm in meshing engagement with said teeth, the inclination of the threads of said worm being arranged to insure non-reversibility of drive.

DANELON, LUIGI.

REFERENCES CITED

The following references are of record in the file of this patent:

UNITED STATES PATENTS

| Number | Name | Date |
|---|---|---|
| 2,066,758 | Bassoff | Jan. 5, 1937 |
| 2,306,544 | Kikuyama | Dec. 29, 1942 |

FOREIGN PATENTS

| Number | Country | Date |
|---|---|---|
| 576,483 | Germany | May 13, 1933 |